United States Patent [19]
Jabr

[11] Patent Number: 5,638,355
[45] Date of Patent: Jun. 10, 1997

[54] OPTICAL INFORMATION REPRODUCING BY DETECTING PHASE SHIFT OF ELEVATED SYMBOLS

[76] Inventor: Salim N. Jabr, 2703 Doverton Sq., Mountain View, Calif. 94040

[21] Appl. No.: 550,379

[22] Filed: Oct. 30, 1995

Related U.S. Application Data

[63] Continuation-in-part of Ser. No. 245,023, May 17, 1994, Pat. No. 5,471,455.

[51] Int. Cl.$^6$ ........................................... G11B 7/00
[52] U.S. Cl. .................... 369/275.4; 369/275.1; 369/109; 369/44.37
[58] Field of Search ............................ 369/275.4, 275.1, 369/109, 107, 44.37, 124

[56] References Cited

U.S. PATENT DOCUMENTS

| | | | |
|---|---|---|---|
| 5,285,274 | 2/1994 | Tanno et al. | 369/109 |
| 5,471,455 | 11/1995 | Jabr | 369/109 |
| 5,493,561 | 2/1996 | Nishiuchi et al. | 369/275.1 |

*Primary Examiner*—Georgia Y. Epps
*Assistant Examiner*—Kim-Kwok Chu

[57] ABSTRACT

Digital information is represented by surface designs with features smaller than the wavelength of the reading light on the surface of a record carrier, said designs producing continuously varying phases of the light reflected from them in a given direction. The designs are written by ion beam or electron beam milling of the surface of a master record carrier, then replicated onto a plurality of polymeric record carriers by stamping or molding. The records can also be written by applying light induced compaction of the surface materials.

20 Claims, 5 Drawing Sheets

OPTICAL INFORMATION REPRODUCING BY DETECTING PHASE SHIFT OF ELEVATED SYMBOLS

This invention is a continuation in part of application Ser. No. 08/245,023 filed May 17, 1994, now U.S. Pat. No. 5,471,455, issued on Nov. 28, 1995.

FIELD OF THE INVENTION

This invention relates to dynamic information storage systems, such as those utilized in computing systems, data storage, video storage and compact disk records, and relates more particularly to such systems wherein the retrieval is done by optical means. This invention is concerned with the storage of very large amounts of data per unit area of the storage medium and the fast retrieval of such data records.

BACKGROUND OF THE INVENTION

This invention is a continuation in part of application Ser. No. 08/245,023 filed May 14, 1994, now U.S. Pat. No. 5,471,455, issued on Nov. 28, 1995, and herein incorporated by reference.

The optical recording and readout of data has been described by numerous authors. Such recording systems are classified into Read Only Media (ROM) which can only be read out optically but have to use a different recording method; Write Once Read Many (WORM) media which can be written optically but only once, and Erasable Write Many Media which can be repeatedly written and read.

The density of data that can be recorded and read by optical recording and retrieval systems is limited by the natural laws of light wave diffraction. Such laws make it impossible to focus a light beam to a spot smaller in diameter than the wavelength of the light. Present systems are also limited in the speed of readout by the amount of light power or brightness that can be focused to a very small diameter spot.

This has led to efforts to develop shorter wavelength high brightness light sources or Lasers. However such lasers emitting blue or shorter wavelengths have proved difficult to make and remain short lived, unreliable and expensive to produce. Other efforts have sought to defeat the effects of diffraction by keeping the recording medium very close to the output port of sub-wavelength sized fiber wave guides. Such wave guides are made by tapering glass fibers from hundred micron diameters down to a fine point of sub micron size diameter. Light launched into the large diameter side travels to the fine tip where it exits towards the recording medium. The drawback of such systems is the very large loss of light power caused by the tapered guides which causes very low light levels on the medium and severely limits the readout speed and write capability.

Another approach to increasing data densities utilizes holographic recording in three dimensional media. In such systems the interference pattern between a data carrying beam and a reference light beam is recorded in a light sensitive medium.

By varying the angle between these beams independent records can be superimposed in a medium and selectively read out as described by F. H. Mok in Optics Letters, vol. 18, p. 915 (1993). The disadvantages of such methods have been the difficulty of developing media sensitive in the wavelength range of available lasers, the complexity of optical readout systems with angular resolution, the instability of the records over time and temperature and the incompatibility of these systems with the presently utilized means of tracking and focusing. Furthermore traditional optical data recording systems consist of a storage medium usually in disk form, with binary digital data recorded thereupon in the form of two physically distinct states. Thus since only two distinct states are used per recording spot or pixel, only one bit of information can be recorded per pixel. A variety of techniques are used to affect a change in the intensity or polarization of the light reflected from the recording surface. The techniques utilizing intensity modulation include the creation of small and large pits, the modulation of the distance between pits and the creation of bumps on a generally flat surface. Light from a laser source is focused onto the data recording areas and then reflected back to a photo detector which transforms the power received into a proportional electrical current. While the disk is rotating, ones and zeroes are read out as high and low current levels in the photo detector.

The techniques utilizing polarization modulation include causing a change in the crystalline phase of the recording medium material, or a change in the state of magnetization. A polarized light beam is then focused onto the data recording areas and suffers a change in its state of polarization upon reflection. The change in polarization is sensed by a detector-polarizer combination Because of noise and drift in the optical power from the lasers and because of possible asperities and dust particles in the beam path as well as the noise generated in the associated electronics; the modulation of intensities or polarizations used must be kept large. This has traditionally limited the modulation states to only two: high and low, corresponding to binary ones and zeroes and limiting storage to one bit per spot. Accordingly storage densities on all optically read disks are limited presently to $10^8$ bits/cm$^2$ by light diffraction. These optical records are used in computer systems for data storage, entertainment systems for audio, video and program storage and in general data archiving systems. One notes that prior art systems generally fail to concentrate a large enough optical power onto a small enough surface area to achieve high density recording without reducing the signal to noise ratio of the readout, and consequently impairing the bandwidth of the readout.

The patent disclosure entitled "High Density Optical Recording System" filed May 1994, application Ser. No. 08/245,023, now U.S. Pat. No. 5,471,455 and hereby incorporated into this disclosure by reference, teaches the reading of data stored as continuously varying differences in step size or index of refraction between adjacent spots on the surface of a record carrier. Such surface steps of continuously varying height can be written by repeated chemical etching. Alternatively said surface steps can be made by other methods including laser ablation of surface layers, ion beam milling, electron beam milling and thin film deposition. In general $2^n$ steps of etching may be required to write n such differential surface steps making the process long and expensive.

OBJECTS AND ADVANTAGES OF THE INVENTION

Accordingly the objective and advantage of the present invention is to teach improved methods of producing on a record carrier, optically readable stored data marks with a surface density of the order of $10^9$ bits per square centimeter that is readable by optical reading techniques.

Further objects and advantages of this invention will become apparent from a consideration of the drawings and ensuing description.

SUMMARY OF THE INVENTION

In accordance with the illustrated preferred embodiment, a high density optical storage record carrier 7 is presented upon which the information is stored in the form of designs written within micron sized mark on said carrier, said designs causing continuously varying optical phase delays between two light beams focused on two adjacent marks of said micron sized marks and reflected back from said marks. A given phase delay between said reflected beams represents a unique numerical value. The range of values that can be recorded as a phase delay between two marks is limited on the low side by the smallest resolvable phase delay and on the high side by the largest unambiguous delay of half a wavelength. By utilizing light interferometry, extremely small phase delays on the order of one ten-thousandth of a wavelength can be measured. The range of values that can be stored per mark is therefore on the order of: $(\lambda/2)/(\lambda/10000)=5000$ per mark. Realizing that 5000 is approximately $2^{12}$, this is equivalent to storing 12 bits of information per mark.

The phase delays are realized by three dimensional designs or glyphs within the area of each mark on the surface. Such structures are less than a wavelength in size and may contain nanometer size features. Although such nanometer size features cannot be resolved or imaged by the light, they nonetheless cause a specific and definite shift in the phase of the light reflected from them relative to the phase of the incident light, or relative to the phase of the light reflected from an adjacent mark. What is new in this disclosure is that when said nanometer size features are of uniform elevation or depth they can be more easily produced by etching or ion beam milling or electron beam milling or thin film deposition, than the multiple level designs of the earlier art.

The features are designed to induce continuously varying phase delays between zero and one half of $\pi$ radians where $\pi=3.1415$. Each difference in phase delay between two surface features represents a unique binary number. If M levels of phase differences can be written and read, then N bits can be stored per spot, where $N=\log_2(M)$ or $M=2N$. The writing of such nanometer size symbols and features can be done by electron beam or ion beam milling of the surface of a master record carder.

The resulting "master" record carder is then replicated onto numerous polymeric record carders by utilizing standard replication techniques such as stamping or injection molding, that are capable of replicating surface features down to nanometer resolution.

DESCRIPTION OF THE DRAWINGS

In the drawings closely related figures have the same number but different alphabetic suffixes.

DESCRIPTION OF THE INVENTION

It is well known that the space dependence of the phase of the electric field representing a light beam reflected from an object, is determined by the shape of the object. This fact allows a light beam to carry information about the object it reflects from. When the size of the features in the object are larger than one wavelength of the light, the object can be imaged by classical optics or holography. This means the object's shape and dimensions can be measured by the space dependence of the phase of the reflected light.

If the features of an object are smaller than the wavelength of the light it follows from the diffraction principle that an incident beam will be scattered and diffracted, and the features of the object can no longer be measured from the phase distribution of the scattered beam. This does not mean however that in a given scattered direction the phase of the scattered light field is not deterministically related to the features of the object. In fact one can imagine that given a direction, say the normal to a surface, there exist an infinity of shapes with ever more complex designs and features smaller than a wavelength, that produce a uniquely defined phase shift in the light beam reflected in that direction. The method of this invention is to choose a finite subset of surface designs, numbering $2^N$, where N is the number of bits to be stored in a spot on the surface, each surface design being chosen to produce a unique and distinct phase shift between zero and $\pi/2$ radians in the phase of the light reflected in the direction normal to the surface. A great simplification in the writing of these designs results when their features have the same size in the direction normal to the surface, say ¼ micron, but continuously variable sizes and shapes in the lateral dimensions along the surface.

Figure 2:
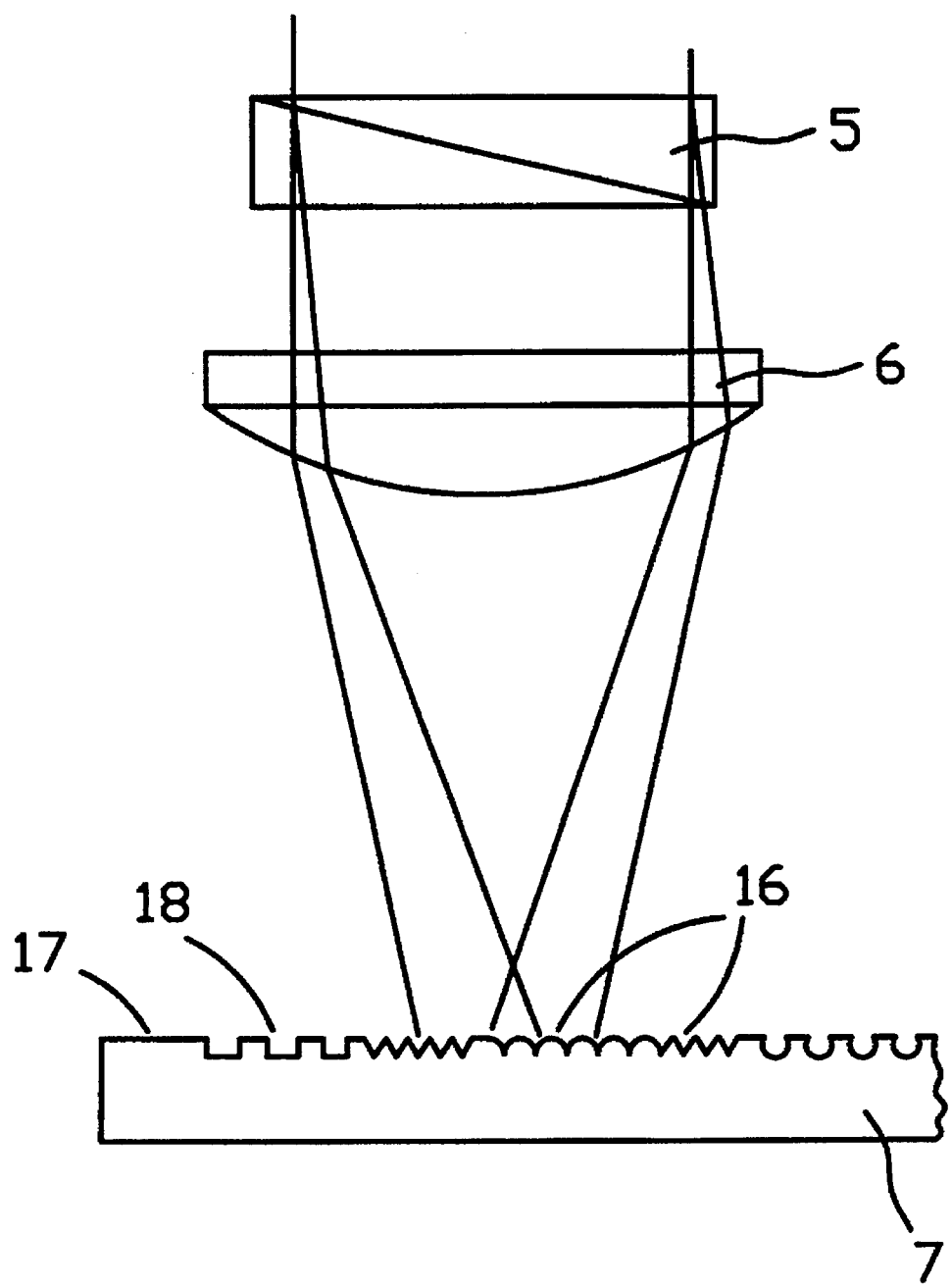
FIG. 2 illustrates the preferred embodiment of this invention.

An illustration of one embodiment of such designs is shown in FIG. 2. Each design consists of a plurality of simple grooves 16 of constant depth but varying width. For each design the phase shift of the light diffracted in the direction normal to the surface is unique and determined by the depth and width of the grooves. The depth being fixed, the width is chosen to produce the desired phase shift. In this fashion the writing of the data onto the record carrier is simplified because only one etching step is now required to etch the design into the surface. For large N, the size of the features required may be too small to be achievable by etching. In this case electron beam milling or ion beam milling of the surface can be used to write the data onto a master record. Ion beam milling utilizes the sputtering property of a beam of oxygen or argon ions accelerated by an electrical potential drop and magnetically or electrostatically focused into a spot of nanometer size. The beam and hence the focal spot can be electrostatically deflected to any point on the surface of a target in a vacuum chamber. The accelerated beam of ions or electrons sputters off atoms from the surface of the target. Thus by controlling the dwell time or the intensity of the ion or electron beam, a controlled amount of material can be removed from the surface and features can be milled that are of nanometer dimensions. These milled features on the master record carder can later be replicated onto a plurality of polymeric carriers by stamping or molding.

It is advantageous for both the milling process as well as for the surface replication process to keep the depth of the features smaller than their lateral dimension. The grooves illustrated in FIG. 3 could have a depth of 5 nanometers and widths varying from 5 to 500 nanometers. A first micron square spot 17 that is flat might represent the null or reference phase shift. A second micron square spot 18 might have 100 grooves 5 nanometers wide and 5 nanometers deep and generate a phase shift of one radian relative to the first spot.

Generally when light is scattered from surfaces with features smaller than a wavelength, the intensity of the light in a given scattered direction is dependent on the details of the surface features. This invention takes advantage of that fact to enhance the intensity of the light collected by the readout mechanism, preferably in the direction normal to the surface of the record carrier. The design in FIG. 2 for example achieves this goal by having the tops and bottoms of the grooves be parallel to the surface of the carder rather than slanted by one of many possible angles.

Figure 3:
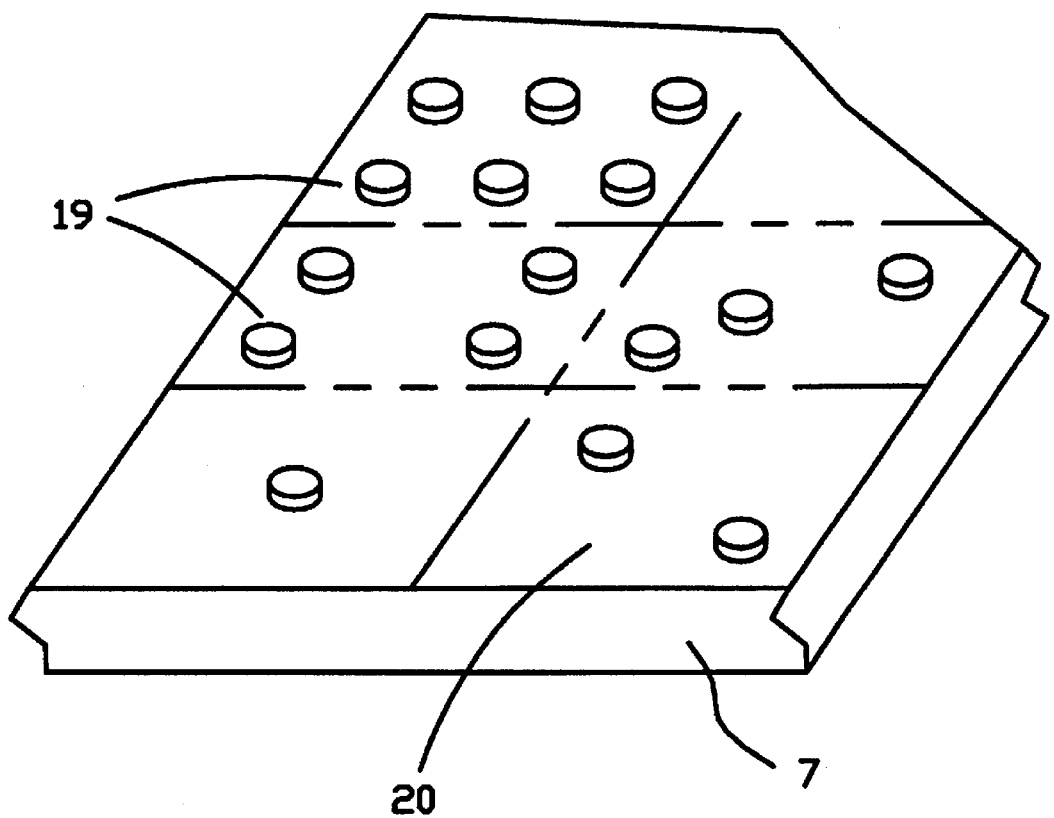
FIG. 3 illustrates a different embodiment, where cylindrical surface features are arranged within each spot on the record carder, to produce predetermined phase shifts in the light beams reflected normal to the surface.

More general surface designs may be used to advantage. In general each design occupying a spot or mark 19 on the surface can comprise one or a multitude of repeated symbols as illustrated in FIG. 3, to generate the desired phase shift. For illustrative purposes, a cylinder 20 of 5 nanometer diameter and 5 nanometer height might generate a $\pi/300$ phase shift. Repeating the cylinder at a random density of 16 cylinders per square micron might generate a phase shift of $\pi/17$. The position of each symbol, say a cylindrically shaped symbol within the said design, contributes a well determined amount to the phase shift of the light beam reflected from the said design and the positions of all the cylinders in a given design can be calculated to give the desired phase shift by using the relation:

$$e^{i\phi} = \Sigma(1/a^2 + x^2 + y^2)e^{i\xi(x,y)}$$

where $\phi$ is the total phase shift, $\xi(x,y)$ is the phase shift due to a symbol at position determined by the surface Cartesian coordinates x, y within the said design and the sum is carded out over all symbols within said design and a is a geometry dependent constant.

Figure 4:
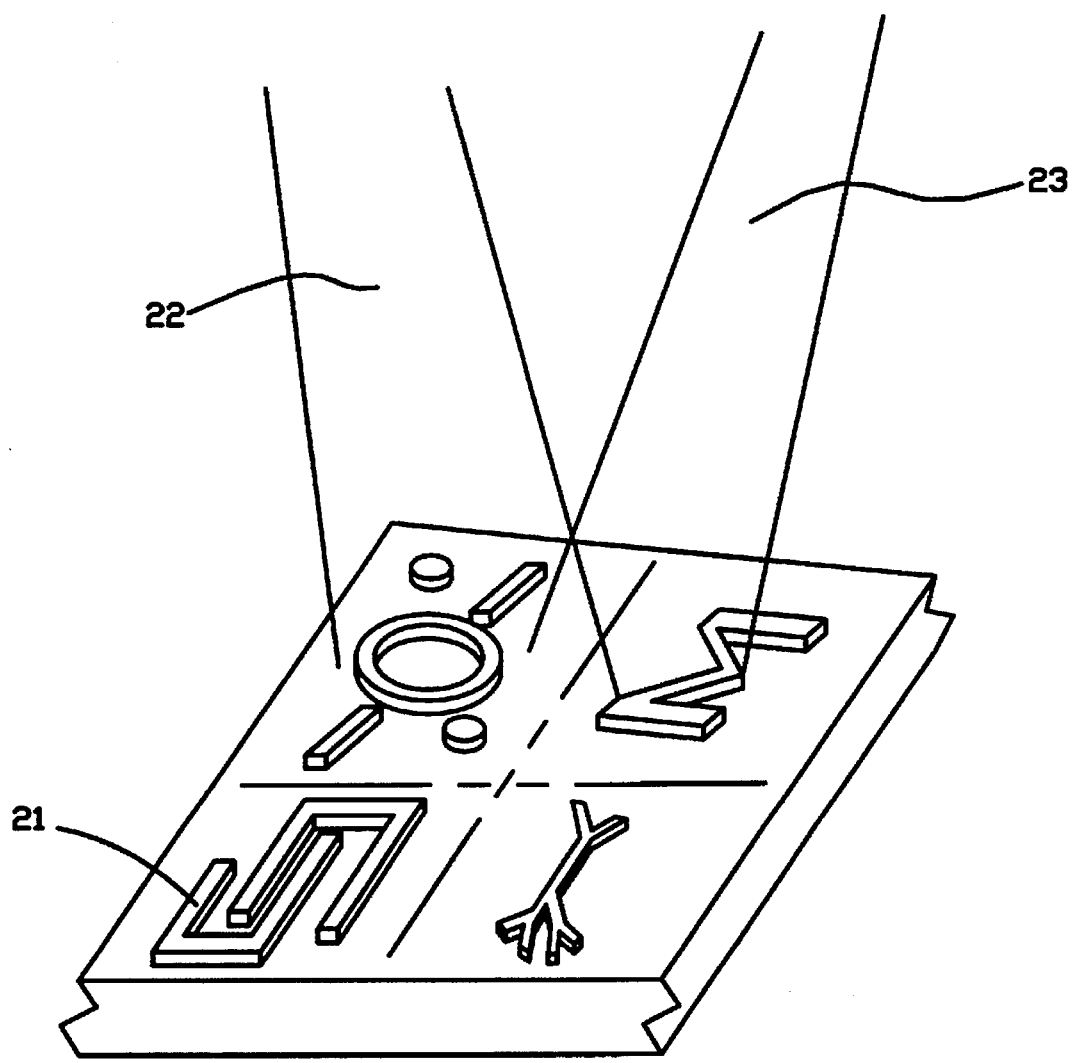
FIG. 4 illustrates a more general class of surface structures designed to generate a well defined phase shift in the light reflected from the surface in a normal direction.

FIG. 4 illustrates a more general set of designs or glyphs 21 that may be used to generate the desired phase shifts between the reflected light beams 22 and 23.

OPERATION OF THE PREFERRED EMBODIMENT

Figure 1A:
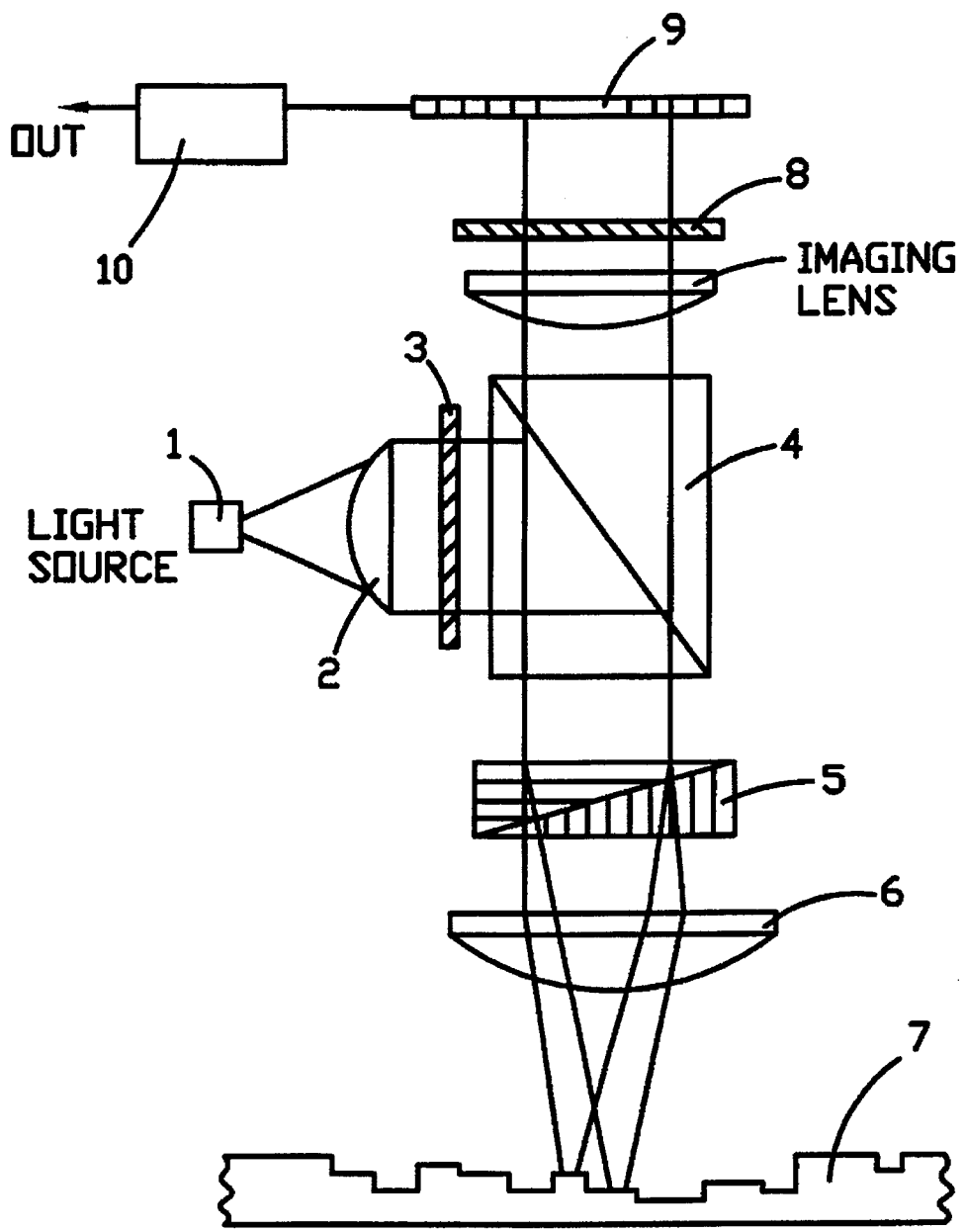
FIG. 1A illustrates the prior art of representing data with differences in surface heights.
Figure 1B:
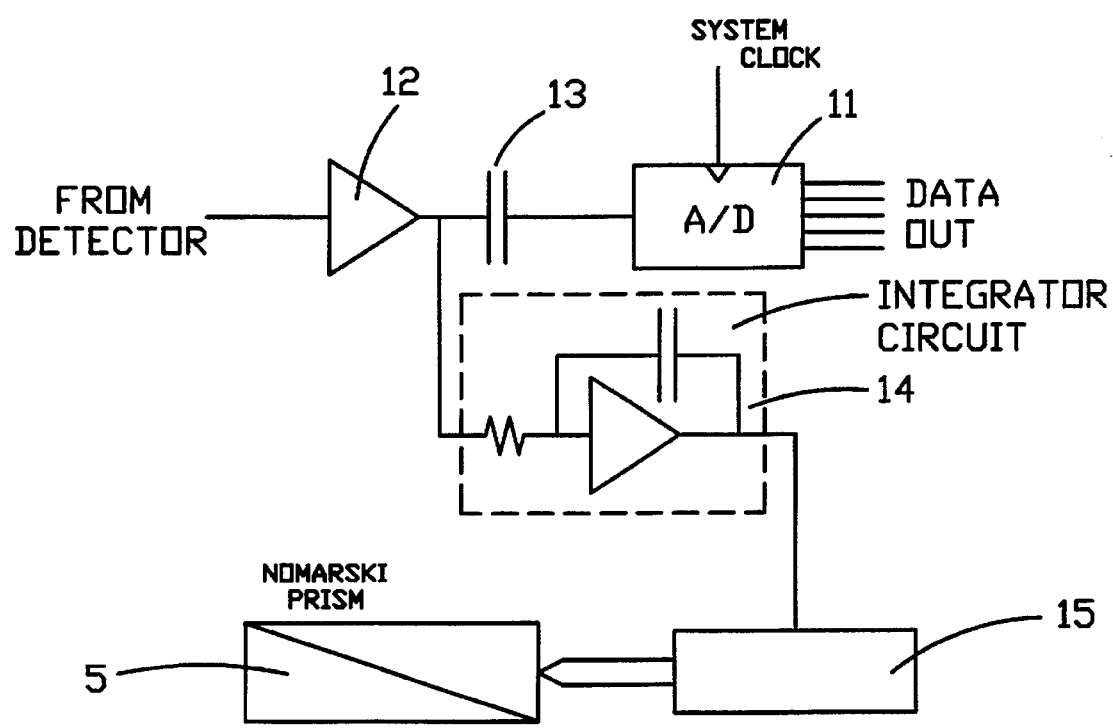
FIG. 1B illustrates the electronics associated with the readout mechanism.

FIG. 1A illustrates the reading of the difference in phase shift produced between two beams reflected from adjacent spots on the surface, by means of differential interferometry. Two light beams derived from the same optical source 1, are split and directed onto the two desired spots on the surface of the record carrier 7. The reflected beams are then re-combined and made to interfere on the surface of a photo detector array 9.

The intensity of the interference pattern is directly related to the phase difference between the two light beams. The details of the reading mechanism are further described in application Ser. No. 08/245,023 filed on May 14, 1994, and herein incorporated by reference.

In operation light from the source 1 is polarized by polarizing means 3 and split into two beams by means 5, said beams then being focused onto two adjacent spots on the record carder 7. The two said beams are reflected by the natural Fresnel reflection or by a reflective thin film coated on the surface of the record 7. The beams are recombined by means 5 and directed to the detector array 9 where they produce an interference pattern. The beam splitting means 5 or the polarizing means 3 are set to cause substantially ninety degrees of phase shift between the two beams. The average light intensity at the light detector 9 is then halfway between zero and its maximum value and the interferometer is in its most linear operating range. Phase changes away from this operating range that may be caused by thermal or mechanical effects are detected by the detector 9, amplified by amplifier 12 and fed back to actuator 15 via a feedback control circuit such as an integrator circuit 14. The electro-mechanical actuator 15 could be a piezoelectric transducer or an electromagnet or a motor, which acts on either the polarizing means 3 or the splitting means 5 to restore the system back to the operating point. The AC part of the detector 9 signal is de coupled from the DC part by a de coupling means 13 and fed to an analog to digital converter 11 such as the Cornlinear Co. CLC920, where it is converted to a digital format at a precise moment in time determined by the system clock. The system clock can be derived from the AC signal pulse train or from the record carrier drive mechanism in fashions well known in the art. The function of the system clock is to insure that the detector signal is latched at a time when the two light beam focal spots straddle a given phase step on the record carrier surface.

The limit of smallest detectable light power is determined by the amount of noise on the light beams plus the noise generated in the detector and amplifier. Photoelectric semi-conductor detector-amplifier combinations such as the AT&T ODL250 have sensitivities on the order of a picowatt per root Hz. Therefore in order to detect a one part per thousand change in the light intensity at the detector, corresponding in turn to one part per thousand change in phase delay, the average light intensity at the detector should then be $10^{-9}$ Watts or one nanowatt for a bandwidth of one Hertz. The light power needed for a bandwidth B would then be proportional to the square root of B. More specifically for a bandwidth of 100 MHz the light power needed would be $10^{-5}$ Watts or 10 microWatts. Such light intensities on the detector would require a source intensity of no more than 100 microWatts. Such source powers are easily achievable and the system is seen to be capable of very high signal to noise ratios and low error rates.

CONCLUSION, RAMIFICATIONS AND SCOPE OF THE INVENTION

Although the description above contains many specificities, these should not be construed as limiting the scope of the invention but as merely providing illustrations of some of the presently preferred embodiments of this invention. For example the record carder can have other shapes such as a rectangular shape or a cylindrical shape and the data tracks thereon can be linear parallel tracks. Further, the newly described method of producing record carders having sub-wavelength sized features that produce well defined phase shifts in the reflected light beams, may be utilized to produce records that are read by any reading method.

Thus the scope of the invention should be determined by the appended claims and their legal equivalent, rather than by the examples given.

What is claimed is:

1. In a high-density optical information storage system having a light source of a characteristic wavelength for illuminating track regions on a record carrier and decoding compressed information stored in said carrier, wherein a smallest unit of said compressed information corresponds to a M-bit word of decoded information, M being a fixed integer greater than 1, an information storage record carrier comprising:

a track structure defined on a substrate consisting of a plurality of said track regions, said M-bit word being uniquely encoded and stored as a physical design such that, when said track regions are illuminated by an incident light beam, a reflected light signal results, said reflected light signal having a phase uniquely determined by said physical design from which said light signal reflects said phase uniquely corresponding to said M-bit word of decoded information, wherein:

said physical design is a selectable, three-dimensional design with a fixed elevation relative to said substrate, said design having features that are smaller than said characteristic wavelength so that said features are not resolvable by said incident light but affect phase of a light beam reflected from said design, said selectable design being selected from a set of designs, each of a plurality of said designs uniquely affecting said phase of said reflected light beam.

2. The high-density optical information storage of claim 1, wherein said phase of said reflected light varies in small steps between zero and one half of said characteristic wavelength.

3. The high-density optical information storage system of claim 2, wherein said phase steps are no smaller than smallest phase delay resolvable using said incident light.

4. The high-density optical information storage system of claim 1, wherein said track regions are of uniform size.

5. The high-density optical information storage system of claim 4, wherein said uniform size is between 0.2 and 2 microns.

6. The high-density optical information storage system of claim 1, wherein said design comprises at least zero grooves having selectable widths smaller than said characteristic wavelength and fixed depths identical to said fixed elevation.

7. The high-density optical information storage system of claim 6, wherein said fixed depths are no larger than said selectable widths.

8. The high-density optical information storage system of claim 7, wherein said selectable widths are between 1 and 500 nanometers.

9. The high-density optical information storage system of claim 6, wherein said selectable widths are of uniform size.

10. The high-density optical information storage system of claim 1, wherein, when said features are definable using an etching process, all designs in said set of designs can be defined on said substrate using a single etching step.

11. The high-density optical information storage system of claim 1, wherein, when said features are definable using a milling process, each design in said set of designs can be defined on said substrate using a single milling step selected from an ion milling step or an electron beam milling step.

12. The high-density optical information storage system of claim 1, wherein said design comprises an arrangement of a uniform symbol, said symbol not being resolvable by said incident light, said arrangement using at least zero of said uniform symbol.

13. The high-density optical information storage system of claim 12, wherein said uniform symbol comprises at least one of the set of shapes including cylinders whose diameter and height are less than said characteristic wavelength, cubes whose side is less than said wavelength, cones whose base and height are smaller than a wavelength and pyramids whose base and height are less than a characteristic wavelength.

14. The high-density optical information storage of claim 13, wherein said diameter is between 1 and 100 nanometers, said base is between 1 and 100 nanometers and said height is between 1 and 100 nanometers.

15. The high-density optical information storage system of claim 12 wherein:

said uniform symbol produces a known, quantum phase shift in a light beam reflected from said uniform symbol; and said phase shift associated with light reflected from said arrangement is determined by number and positions of said at least one uniform symbol used in said arrangement;

such that larger phase shifts, up to one half of said characteristics wavelength, are produced by larger numbers of said uniform symbols, said positions of said uniform symbols being determined so that said quantum phase shifts associated with said uniform symbols in said arrangement combine in a known way to produce said phase shift associated with light reflected from said arrangement.

16. The high-density optical information storage system of claim 1, wherein said design comprises a glyph being a free-form character defined in one of said track regions that produces a known phase shift in a light beam reflected from said glyph, said glyph not being resolvable by said incident light.

17. In a high-density optical information storage system having a light source that generates partially coherent light of a characteristic wavelength for illuminating simultaneously a plurality of adjacent track regions and decoding compressed information corresponds to a M-bit word of decoded information, M being a fixed integer greater than one, an information storage record carrier comprising:

a track structure defined on a substrate consisting of a plurality of said track regions, said M-bit word being uniquely encoded and stored as an optically-detectable difference in a physical characteristic of adjacent, first and second track regions; such that, when said first and second track regions are illuminated simultaneously by said partially coherent incident light, a reflected light signal with corresponding first and second reflected beams results, said first and second reflected beams having, respectively, a first and second phase with a phase difference uniquely determined by said optically-detectable difference; said phase difference uniquely corresponding to said M-bit word of decoded information, wherein:

said physical characteristic is a selectable, three-dimensional design with a fixed elevation relative to said substrate, said design having features that are smaller than said characteristic wavelength so that said features are not resolvable by said partially coherent incident light but affect phase of a light beam reflected from said design, said selectable design being selected from a set of designs, each of a plurality of said designs uniquely affecting said phase of said reflected light beam.

18. The high-density optical information storage system of claim 17, wherein said design comprises an arrangement of a uniform symbol, said symbol not being resolvable by said incident light, said arrangement using at least zero of said uniform symbol.

19. The high-density optical information storage system of claim 18, wherein said uniform symbol comprises at least one of a set of shapes including cylinders whose diameter and height are less than said characteristic wavelength, cubes whose side is less than said wavelength, cones whose base and height are smaller than a wavelength and pyramids whose base and height are less than a characteristic wavelength.

20. The high-density optical information storage system of claim 17, wherein said design comprises a glyph being a free-form character defined in one of said track regions that produces a known phase shift in a light beam reflected from said glyph, said glyph not being resolvable by said incident light.

* * * * *